May 1, 1945.　　　　G. VIGO　　　　2,375,180
APPARATUS FOR JET PROPULSIVE AND OTHER PURPOSES
Filed Feb. 29, 1944

INVENTOR.
G. Vigo.
Per A. Millward Hack
His Attorney

Patented May 1, 1945

2,375,180

UNITED STATES PATENT OFFICE 2,375,180

APPARATUS FOR JET PROPULSIVE AND OTHER PURPOSES

George Vigo, Valetta, Malta

Application February 29, 1944, Serial No. 524,444
In Great Britain November 8, 1943

1 Claim. (Cl. 230—95)

This invention relates to means for utilising the energy of fluids issuing as jets from nozzles for propulsive and other purposes.

It is already known to employ a jet of high pressure such for example as fuel combustion products issuing from a nozzle within a Venturi or like tube to induce a fluid stream of lower pressure for the purpose of creating motive power either indirectly through the medium of turbines pumps or other engines or directly by reacting on the atmosphere or water as in jet propulsion applied to aircraft or ships and the primary object of the present invention is to increase the efficiency of such apparatus.

According to the present invention a fluid at high pressure is utilised to propel a fluid stream of lower pressure through a nozzle the outwardly tapering bore of which is so formed as to eliminate the effects due to friction and uncontrolled eddying currents consequent on the gradual enlargement of the bore of the nozzle.

This invention will be now more particularly described making reference to the accompanying drawing which shows by way of example one embodiment of the invention.

Figure 1:
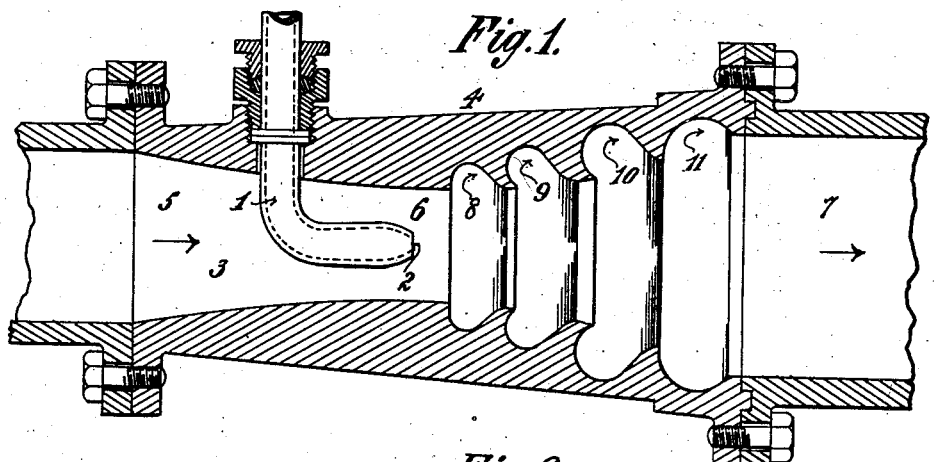
Figure 2:
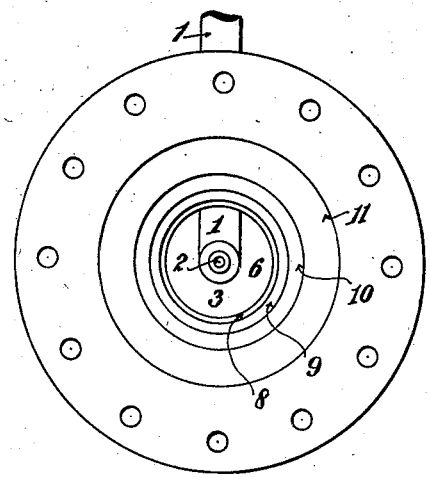
Figure 3:
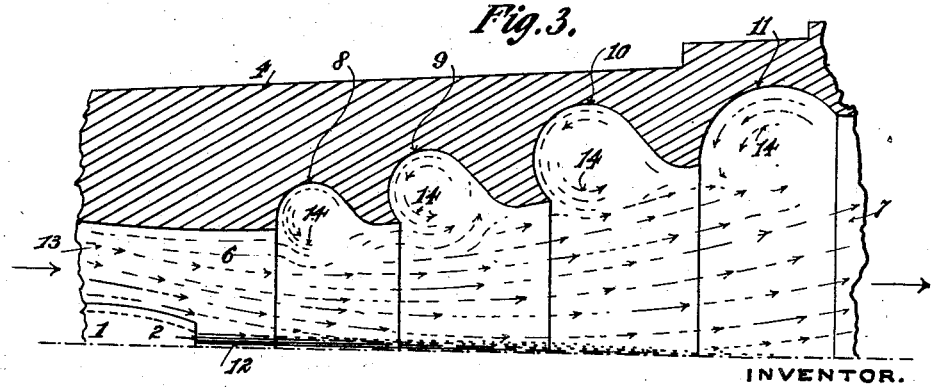

In the drawing Fig. 1 is a sectional view in side elevation, Fig. 2 is a view in end elevation, and Fig. 3 is an enlarged sectional part view in side elevation showing diagrammatically the working principle of the invention. Throughout the views similar parts are designated by like numerals of reference.

A nozzle 1 adapted to be put in communication with any source of high pressure fluid has its exit end 2 centrally arranged within the bore 3 of a delivery nozzle or tube 4. The bore 3 is formed in the manner of a Venturi tube, i. e. it converges from its entrant end to a throat 6 slightly in advance of the exit end 2 of the nozzle 1 and then diverges outwardly to the exit end 7.

Within the bore 3 nearest the throat 6 and towards the exit end 7 is formed a circumferential annular recess 8 of approximately a semi-circular shape in cross section with a tapering off towards its outer edge as shown. Adjacent to said recess 8 and following it towards the exit end 7 are formed other circumferential recesses 9, 10 and 11 each of a similar shape in cross section but of a successively increasing size or capacity. Each of the recesses 8, 9, 10 and 11 form annular spaces around the discharging fluid which by virtue of the turbulence arising through the flow of the fluid causes vorticular fluid rings to originate within them and so diminish or eliminate the effects due to uncontrolled eddying currents consequent on the gradual enlargement of the bore towards its exit end 7.

In operation, see particularly Fig. 3, the impinging jet of high pressure fluid 12 drives the stream of surrounding lower pressure fluid 13, flowing from its entrant end 4, past the nozzle 1 to its exit end 7. The uncontrolled eddying currents consequent on the gradual enlargement of the bore of the nozzle and the frictional loss arising out of such a flow is impeded by the vorticular fluid rings 14 created in the recesses 8, 9, 10 and 11, which react on the flowing stream in such a way as to ease the flow by imparting to it the greater part of their inertia.

I declare that what I claim is:

Jet propulsive apparatus for utilizing the energy of a fluid issuing as a jet to propel a fluid stream of lower pressure, comprising a Venturi tube, inlet and outlet conduits in communication with the bore of said tube, a nozzle in communication with a source of high pressure fluid and having its exit end axially and centrally arranged within the throat of said tube to direct the fluid in an axial direction towards the outlet of the tube, and a plurality of circumferential annular recesses formed successively in the inner wall of the outwardly tapering bore of the outlet end of said tube, each said recess being of an approximate semi-circular shape in cross section and of a successively increasing size or capacity from the recess nearest to the exit end of the high pressure nozzle to the outermost recess adjacent to the outlet end of said tube.

GEORGE VIGO.